United States Patent [19]

Henton et al.

[11] 4,419,496

[45] Dec. 6, 1983

[54] PARTICLE AGGLOMERATION IN RUBBER LATICES

[75] Inventors: David E. Henton; Teresa M. O'Brien, both of Midland, Mich.

[73] Assignee: The Dow Chemical Company, Midland, Mich.

[21] Appl. No.: 350,849

[22] Filed: Feb. 22, 1982

[51] Int. Cl.$^3$ ............................................. C08F 279/02
[52] U.S. Cl. .................................. 525/301; 525/902; 525/78; 524/460
[58] Field of Search ................. 525/301, 902; 524/460

[56] References Cited

U.S. PATENT DOCUMENTS 4,134,872  1/1979  Lee ....................................... 524/460
4,264,678  4/1981  Nelsen ................................. 525/301
4,315,085  2/1982  Ozari ................................... 525/902

Primary Examiner—Paul R. Michl
Attorney, Agent, or Firm—Jonathan W. Morse

[57] ABSTRACT

Particle size distribution in elastomeric latex preparations is advantageously controlled and improved by treatment of the prepared latex with an agglomerating agent (AgAg) copolymer having an elastomeric "core" and grafted thereto a "shell" of interpolymer comprising polymerized acid and ester comonomers. The grafted interpolymer can beneficially be a polymerized mixture of ethyl acrylate and methacrylic acid. Agglomerated latex product can be recovered for direct utilization of its favorably particle size-distributed elastomeric component or for other purposes such as grafted polymer blends, ABS and similar products.

25 Claims, No Drawings

PARTICLE AGGLOMERATION IN RUBBER LATICES

BACKGROUND OF THE INVENTION

Elastomeric (rubbery) latex products having an optimized distribution of large and small particles interdispersed therein are desirable for many utilizations and applications.

Particularly desirable uses for such materials include the so-called "rubber-modified" and/or "rubber-reinforced" polymer compositions whereby the impact resistance of various polymeric compositions is improved to provide desirable resins and resin products. These may be merely blended polymer (i.e., "polyblend") compositions or grafted polyblend compositions made by polymerizing a usually addition-polymerizable monomer (or mixture of monomers), such as styrene or a suitable mixture of styrene and acrylonitrile, in the presence of a dissolved or otherwise dispersed elastomer, such as polybutadiene to achieve a matrix comprising some polymer grafted to said elastomer and some that is not. Among the many desirable resin materials so preparable are: expandable or foam-providing compositions; molding materials; coatings and so forth.

The physical properties of rubber-reinforced or -modified polymeric products are frequently materially dependent upon the degree and variety of the particular dispersion of the elastomeric modifying agent to be found within the polymer matrix.

Predominant among the effects of having included in the polymeric matrix, elastomeric latices and various other rubber particle inclusions of relatively small average particle size, such as those having approximately 1,000 Angstrom (Å) or so particle diameters, is the tendency of such rubber-containing compositions to result on shaping, as in injection molding operations, in formed articles having high gloss. At the same time, the small particle size can sometimes lead to intolerably low impact resistance and detrimental effects on other physical properties such as elongation. On the other hand, the obverse is frequently true (e.g., low gloss—high impact resistance, etc.) when the particle size of the rubber inclusion is relatively large, such as those with an average particle size diameter in the range of 1–5 or more microns ($\mu$).

It is well known in the art that the more attractive and desirable rubber-modified polymer compositions for most molding and other purposes achieve and exhibit optimized compromise in properties when they have therein interdispersed a distribution of relatively large through relatively small elastomer particles, such a distribution being hereinafter referred to as a polydisperse particle size distribution. Notwithstanding, effectively, efficiently and economically achieving optimum particle size distribution is not easily accomplished.

For example, obtaining polybutadiene and like elastomeric latex products having particles of relatively larger size therein by polymerization to such sizes usually necessitates resorting to undesirably and inconveniently long reaction times for their preparation. A further problem associated with the relatively small sized particles is that polymerization techniques, per se, do not always avoid the disadvantages of having to handle (usually in somewhat bulky, low solids level intermediate forms) latex materials which contain relatively small-sized elastomer particles in a narrow distribution range, such as is often found in latex products wherein average particle size diameter is on the order of about 800 to about 1200 Å.

One general technique that, by means of various approaches to its accomplishment, has had application in order to generate larger-sized particles especially in polydispersion with smaller-sized particles in elastomer latex products is to induce limited or controlled agglomeration of at least a portion of the smaller particles in the latex material being treated. This has been done by employment of various agglomerating agents including some that are polymeric in nature. In any such procedure, it is oftentimes important to avoid actual coagulation of the latex undergoing the agglomeration treatment. This is especially true when the elastomer produced, having polydispersed particle size is intended for subsequent direct use as unrecovered elastomer-containing emulsion or dispersion in reactive processing to make graft-polymerized products with styrenic polymers, particularly copolymers of styrene and acrylonitrile. Of course, precautions against coagulation are without bearing if the polydisperse-particle-size elastomer in an agglomerated latex is to be recovered as "crumb" (or the like) (a) for direct manufacture into rubber goods, (b) for polyblending operations or (c) for ensuing dissolution in mass (or bulk) or other solvent-system preparations of various graft copolymerized products.

There have been several noteworthy procedures to effect limited or controlled agglomeration in elastomeric latices. These include such approaches as are disclosed in:

(a) U.S. Pat. No. 3,666,704 to Keppler and Wesslau wherein it is taught that some rubber latices, namely those which are less than 95% polymerized can be agglomerated to yield a latex having larger particles by employment of an agglomerating agent which is a latex of a polymer containing polymerized therein from 0.5 to 50 weight percent of a monomer which yields a water soluble polymer.

(b) U.S. Pat. No. 3,956,218, also to Keppler and Wesslau, wherein a synthetic rubber latex is similarly agglomerated by employment of an agglomerating agent which is a latex of a polymer containing polymerized therein a minor amount of monomer which yields a water-soluble polymer, which polymeric latex agglomerating agent also contains polymerized throughout a major amount of a monomer which yields a water-insoluble polymer.

(c) U.S. Pat. No. 3,825,621 to Ford, wherein a process is taught to use an interpolymeric agglomerating agent to produce an agglomerated latex which is then used in a grafted polyblend composition.

Other teachings involving rubber-containing polymer compositions having polydisperse rubber particle size characteristics are included in U.S. Pat. Nos. 3,446,873; 3,509,237; 3,991,136 and 4,009,226; the teachings of all of which as well as those in the References identified in the foregoing items (a) through (c) are here incorporated by reference thereto.

Nonetheless, nothing in prior art appears to realistically concern itself with a simple and efficient way to achieve controlled agglomeration of elastomeric latices, including polybutadiene rubber latex products, to get better particle size polydispersion using minimized amounts of agglomerating agent and achieving minimized levels of deleterious residual contaminants.

OBJECTS OF THE INVENTION

It is therefore an object of the present invention, to provide an improved agglomerating agent which is suitable for agglomerating elastomer latices wherein polymerization of the polymeric particles is more than 95% completed, which agglomerating agents will be usable with a wide variety of elastomer latices and will introduce into such latices minimized amounts of deleterious, contaminating components.

It is also an object to provide an improved process for the agglomeration of elastomer latices using such improved agglomerating agents and also to provide improved processes for producing impact resistant polymeric compositions having incorporated therein amounts of the desirable agglomerated elastomer latices achieved in accordance with the aforementioned improved process.

Additional objects are to provide improved elastomer compositions having particles agglomerated in accordance with the present invention and also to provide improved impact resistant polymer compositions having incorporated therein amounts of such improved agglomerated elastomer composition.

These objects and many other additional benefits are all achieved in the present invention as it is described herein.

FIELD OF THE INVENTION

The instant invention concerns certain grafted copolymers and the use of such copolymers for the controlled agglomeration of various elastomeric latex preparations to obtain products having an advantageous distribution of particle sizes therein. Such products are useful for a variety of purposes and are especially useful for the manufacture of rubber-modified polymer compositions such as acrylonitrile/butadiene/styrene (ABS) polymer compositions wherein a rubber, usually comprising butadiene, is used to modify a styrene/acrylonitrile (SAN) copolymer matrix or continuous phase.

Insofar as concerns the preparation of impact resistant ABS and ABS-type materials with reinforcement-supplying elastomers from latices agglomerated in accordance with the present invention, the use of such agglomerated latices generally results in improved products and processes for their production. The products achieved have beneficially varying sized rubber particle inclusions therein and can be prepared utilizing the present invention by continuous or other types of processes without significant batch-to-batch variation in product character and properties.

ABS and ABS-type resins have been known for many years. Analogous benefits and advantages are obtained when agglomerated elastomeric latex materials are employed for the preparation in any desired way of other impact resistant polymer products such as the well-known and extensively utilized high impact polystyrene (HIPS) products.

Also contemplated within the scope of the invention are fabricated articles employing the foregoing compositions.

For immediate descriptive purposes and as is known in the art, the terms "graft(ed) polymer or copolymer" and "graft polymerized or copolymerized" contemplate and are intended to embrace compositions having a first, superstrate component grafted to a second, substrate component. In general, the first superstrate components are polymers (including what are often referred to as interpolymers) of monomeric materials, such as acrylates, acrylonitrile, styrene and so forth. Said polymeric or interpolymeric first components are then graft polymerized onto the second substrate component, forming polymeric chains attached to said second component. Such second components are different, preformed, polymerizably reactive substrate compositions such as polybutadiene.

SUMMARY OF THE INVENTION

The present invention and the discovery on which it is based relate to the utilization as agglomerating agents (AgAg's) of interpolymers of certain ethylenically unsaturated carboxylic acids and certain esters copolymerizable therewith as the shell material in "shell/core" types of graft polymers in which a grafted polymer superstrate more or less accretes around a central elastomeric substrate as the superstrate polymer is polymerizing. Such AgAg's provide better controlled agglomeration of elastomeric latex compositions for enhanced achievement of latices with particles having a broad distribution of particle sizes (i.e., polydispersed particle size distribution) and especially latices wherein both the sizes of the particles and the numbers of particles having certain sizes are optimized (i.e., optimized particle size distributions). An example of an optimized particle size distribution is a bimodal particle size distribution, wherein an elastomer latex is less than 100 percent agglomerated and therefore has groups of particles having two relatively distinct particle sizes. One group, having the larger particle size, is the group of particles formed by the agglomeration of many of the small particles. The other group is the group of original, small particles which did not agglomerate.

The present agglomerating agents and processes are suitable for use with completely polymerized or at least substantially completely polymerized elastomeric latices (e.g., more than 95 percent finished insofar as concerns depletion of polymerizable ingredients therein).

PARTICULARIZED DESCRIPTION OF THE INVENTION

The essence of this invention is the provision and utilization of an AgAg which comprises a "shell/core" type of graft polymer having a core or substrate of a natural or synthetic rubber elastomer and grafted thereto a shell of a copolymer of a minor portion of ethylenically unsaturated carboxylic acid and a major portion of vinyl ester copolymerizable therewith. Such AgAg's are useful for agglomerating treatment of an at least substantially completely polymerized elastomer latex composition in order to provide polydispersed particle size distribution as well as optimized particle size distribution arrangements in the agglomerated latex product. With great advantage, the resulting agglomerated latex material can then be directly utilized for preparation of mass, emulsion, or suspension polymerized, rubber-modified impact-resistant polymer products, such as ABS, HIPS and so forth. The agglomerated elastomeric latex product may also be employed for or converted to any other use to which such materials are adapted or desired.

The agglomerating agents disclosed herein and utilized in the practice of the processes disclosed herein are "core/shell" type graft polymers comprising:

(a) as shell material, from about 5 to about 50 weight percent based on the total weight of the AgAg (wt. % based on AgAg) of a polymerized mixture of:

(i) from about 80 to about 99.5 weight percent based on the total weight of shell material (wt. % based on shell) of ester monomer of the formula:

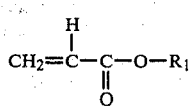

wherein $R_1$ is a lower alkyl radical containing from one to about 4 carbon atoms; and (ii) from about 0.5 to about 20 wt. % based on shell of an ethylenically unsaturated mono- or difunctional carboxylic acid having from about 3 to about 8 carbon atoms; and (b) as core material, from about 50 to about 95 wt. % based on AgAg of an elastomer having polymerized therein essentially no ester monomer which is polymerized in the shell material.

As used herein the term "shell material" refers to the interpolymer or copolymer of ester and acid monomers which is graft polymerized onto an already prepared core material. Usually, the shell material comprises a major amount of copolymer which is grafted directly to the core material and a minor amount of copolymer which is not so grafted. Though copolymers of a single species of ester monomer and a single species of acid monomer are generally preferred for use as the shell material, it is also possible to use copolymers comprising more than one species of either or both types of monomers.

The shell materials suitable for use in the present invention are most effective when they are of a rubbery nature and are not highly crosslinked. For this reason, substantial amounts of monomers, which form polymers which are not rubbery at desired agglomerating temperatures, such as those polymers having glass transition temperatures (Tg's) above 0° C., should not be polymerized into the shell nor should substantial amounts of monomer which tend to form highly crosslinkable polymers. Examples of such monomers which are undesirable shell monomers include styrene and acrylonitrile, which produce high Tg polymers and dienes, which produce easily crosslinkable polymers.

Concerning the ester monomer, it has been found that particularly preferred agglomerating agents can be prepared by using ethyl acrylate (EA) as the major or only ester-type monomer to be polymerized into the shell material.

It has been found that particularly preferred types of acid monomers are mono- or difunctional ethylenically unsaturated carboxylic acids having the formula:

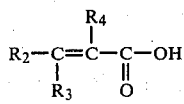

wherein $R_2$ and $R_3$ are independently selected from the group consisting of —H and —COOH and $R_4$ is selected from the group consisting of —H, —COOH and lower alkyl radicals containing up to about 4 carbon atoms. As used herein, mono- or difunctional carboxylic acids are those carboxylic acids having one or two —COOH groups, respectively. Acrylic acid (AA) is a preferred monofunctional acid monomer while methacrylic acid (MAA) is especially preferred. Maleic and fumaric acids are desirable difunctional acid monomers.

The shell material generally constitutes from about 1 to about 50 weight percent of the AgAg. It has been found, however, that it is preferred to have from about 5 to about 45 wt. % based on AgAg of shell material, while about 15 to 35 wt. % based on AgAg of shell material is especially preferred.

The shell material usually comprises from about 80 to about 99.5 weight percent (based on the total weight of only the shell material) of polymerized ester monomer. Preferably, however, said shell comprises about 85 to 98 wt. % based on shell and most preferably about 90 to 95 wt. % based on shell of polymerized ester monomer.

The shell also comprises an acid monomer, polymerized with the ester monomer, the acid monomer being present in amounts of from about 0.5 to about 20 wt. % based on shell, preferably about 2 to 15 wt. % and most preferably about 5 to 10 wt. %.

The above-identified shell materials are conveniently prepared by adding a stream of the desired mixture of monomeric acid and ester components to a heated elastomer latex preparation which is desired as core material in the presence of conventional additives and catalysts; then maintaining the mass at an elevated temperature under somewhat acidic conditions in the media until formation of the AgAg interpolymer product has been accomplished. Of course, the quantity of the monomer mixture to employ should be stoichiometrically adequate to ensure attainment of the final composition desired for the AgAg. The average size of the elastomer latex cores employed in AgAg preparation is advantageously 600 to 2500 Å, with something on the order of 1000 Å being ordinarily quite suitable. Operating temperatures in the 5°–100° C. range, frequently from about 65°–95° C., are appropriate for the preparation which is generally facilitated by efficient stirring of the mass during the course of the reaction. It is usually satisfactory to maintain a pH level of about 2 to 4 in the reaction mass while the AgAg is being formed. In usual cases depending to some extent on other of the involved reaction conditions imposed and particular reactants utilized, the time required for AgAg-synthesis (adequate conversion of reactant ingredients) is ordinarily not in excess of about 5 hours.

In general, the core material can be practically any elastomeric material. The elastomers suitable for use as core material usually have the same composition as the elastomer to be agglomerated insofar as monomer types and ratios or a composition very similar thereto, though this is not required. Such elastomers, which are suitable for use as core material and/or are the elastomers in latex form, which can be agglomerated, usually comprise polymerized butadiene. In fact, polybutadiene and especially interpolymers of butadiene with styrene, acrylonitrile and/or methyl methacrylate are preferred elastomeric core materials for preparation of AgAg's and AgAg's comprising those core materials are advantageously used to agglomerate the particles of latices of the same or similar elastomeric materials. In this way a portion of an elastomer latex can advantageously be used as the core of an AgAg and the AgAg can then be used to agglomerate the remainder or additional portions of the same elastomer latex.

In general, however, the elastomers suitable for use as core materials and the elastomer latex particles to be agglomerated may be independently selected from a wide variety of elastomeric materials. For example, natural rubber is suitable for either use. Very often the core material and the elastomer latex to be agglomerated are conjugated 1,3-diene homopolymer synthetic rubbers or synthetic rubber compositions comprising between about 25 and 100 wt. % of a 1,3-diene, preferably greater than about 50 wt % and most preferably greater than about 70 wt. % Such 1,3-dienes have the general formula:

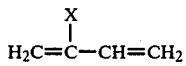

wherein X is selected from the group consisting of hydrogen, chlorine and methyl radicals.

Examples of such 1,3-diene-containing synthetic rubbers are, besides polybutadiene: polyisoprene; styrenebutadiene copolymers (SBR); and butadiene/acrylonitrile copolymers. For present purposes, the synthetic rubber is generally emulsion-prepared.

Examples of synthetic rubbers not containing any 1,3-diene polymerized therein include acrylate rubbers, such as polybutylacrylate and interpolymers of butylacrylate with other monomers, such as one or more of the monomers selected from the group consisting of acrylonitrile, styrene, methyl methacrylate, ethyl acrylate and vinylidene chloride; said acrylate rubbers often containing up to about 5% of polyvinyl crosslinking agent such as ethylene glycol dimethylacrylate or divinyl benzene.

Synthetic rubbers are often polymers as is above indicated, of one or more 1,3-dienes with up to about 50% by weight of one or more monoethylenic monomers of the formula:

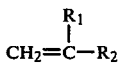

wherein at least one of the connected $R_1$ and/or $R_2$ groups is a group which substantially increases the electrical dissymmetry or polar character of the monomer molecule.

Examples of preferred types of monomers copolymerizable with 1,3-dienes such as butadiene are: (1) the alkenyl aromatic monomers, (2) the unsaturated carboxylic acids and their esters, and (3) nitriles; examples of such monomers being styrene, acrylic acid, methacrylic acid, methyl acrylate, ethyl acrylate, butyl acrylate, methyl methacrylate, acrylonitrile (AN), alpha-methacrylonitrile, substituted styrenes, methylvinyl ketone, and methylisopropenyl ketone.

It has been found that the efficiency of the agglomerating agent is highest when both the core of the agglomerating agent and the elastomer particles to be agglomerated are as rubbery as possible. In other words, it is desirable to have both elastomeric materials slightly crosslinked, but not overly crosslinked nor having Tg's high enough to inhibit the agglomerating effects.

The synthetic rubber compositions suitable for use in the present invention either as core material or as the elastomer latex to be agglomerated can have a number of different latex particles structures or combinations of particle structures. For example, suitable structures range from substantially homogeneous homo- or interpolymeric particles to onion-like structures having several layers, such layers having varying compositions. Synthetic rubber compositions having combinations of different particle structure types are, of course, suitable for use also.

It should be noted when discussing which monomers can be copolymerized into the elastomer core material of the present AgAg's that, in contrast to suggestions in some of the earlier teachings in the area of AgAg's that said similar prior art agglomerating agents need a copolymerized hydrophobic comonomer polymerized throughout said AgAg's (i.e., common to both surface and internal areas), the present AgAg's do not require for preparation or for operability that a polymerized hydrophobic comonomer be present in both the core material and the shell material grafted thereto. In fact, pursuant to the present invention, very desirable agglomerating agents are prepared, the core material of which comprises polymerized therein essentially none of any ester monomer polymerized in the shell material, ester monomer being the only hydrophobic type of monomer polymerized into the shell material. Especially preferred AgAg's are prepared having core material consisting essentially of a copolymer of butadiene and one or more copolymerizable monomers selected from the group consisting of monovinylidene aromatic monomers, nitriles and unsaturated carboxylic acids. The present invention therefore advantageously enlarges the number of monomers and monomer combinations usable in agglomerating agents beyond what is taught or suggested in the art.

It should also be noted that both the interpolymerized AgAg material used for elastomer latex agglomeration in the practice of the present invention and many of the rubber-modified, impact resistant thermoplastic products obtained by various ways when the agglomerated elastomer products are combined with other, less impact-resistant polymeric compositions may be characterized as "graft" copolymers. They are various arrangements of a "rubbery" or "elastomeric" center or other possible "backbone" or "substrate" elements to which are attached the "grafts" of the interpolymerized monomer units.

Many of the impact-resistant polymer compositions containing an agglomerated elastomer are prepared by thermal or free-radical-catalyst-initiated polymerization of the matrix polymer by emulsion, mass, solution or suspension polymerization procedures. For use as the modifying rubber in most mass or solution processes for preparing a rubber modified plastic composition as well as some suspension processes, an agglomerated elastomer latex should first be either (a) partially grafted and coagulated to "crumb" or (b) phase transferred or extracted into an organic phase, before such latices are utilized. Otherwise, for preparation of a rubber-modified polymer composition via a typical emulsion or suspension process the agglomerated elastomer latex in its dispersing media can be directly used for polymerization of the matrix polymer.

In order to satisfactorily agglomerate the particles of a given completed elastomer latex mass, the AgAg additive material is simply added to the latex mass having a pH of from about 7 to about 11 and thoroughly mixed therewith, after which the desired agglomeration occurs. The "completed" latex to be treated is one that most advantageously is more than 95% polymerized, that is, more than 95% of the monomer in the latex is in the form of polymer. It is generally most practical and desirable to directly add the AgAg material in the liquid form of the latex vehicle in which it has been prepared without intermediate recovery therefrom of the AgAg in solids or other concentrated form. Of course, in cases where AgAg materials are prepared (as is possible) by formation of the shell material via polymerization to the elastomer core material in other than a latex media (as in solution polymerization) and the AgAg then recovered as an intermediate solid, as well as in cases where intermediate AgAg solids are recovered from latex preparation masses; such AgAg solids may be redispersed in a suitable (usually aqueous) carrier for introduction to the completed elastomer latex product to be agglomerated.

In cases where it is desired to produce rubber modified polymeric compositions comprising agglomerated elastomeric materials via an emulsion polymerization process, the AgAg can be beneficially added directly to systems comprising the elastomer and interpolymerizable monomer(s). In such a process the AgAg can be added prior to grafting of such forming polymers onto said modifying elastomer or after some grafting of polymer to rubber has occurred and up to the point where the agglomeration is inhibited and coalescence of the rubber is prevented.

It is generally beneficial to have the pH of the latex mass being treated in a range of from about 7 to about 11 (i.e., in a somewhat basic condition). A pH on the order of 9 or so usually gives best agglomerating results. The rubber latex to be agglomerated may have a suitable pH without modification, or if it has been prepared in an acidic medium, such latex may have to have its pH adjusted prior to or during treatment with an AgAg to achieve a more basic pH. This can be done with $NH_4OH$ or a similar reagent.

Among other factors and influences hereinafter more fully brought out, the time required for agglomeration to occur is dependent on the treating temperature utilized. Thus, when room temperature is employed, "aging" periods of several hours may be required to achieve desirably high levels of larger sized particles in the elastomer latex undergoing modification. Resorting to artificially elevated treating temperatures, up to those tolerable by the elastomer latex being agglomerated without deleterious influence thereon, materially hastens the effect in most cases. Accordingly, the treatment is usually better conducted in the 50°–100° C. range. In this connection, the use of elevated temperature is convenient when the agglomerating treatment is to be done on a recently completed elastomer latex product still in process, and is especially practical when such agglomerated latex is to be directly utilized immediately after agglomeration and without cooling for preparation of rubber-modified, impact resistant polymer products via the solution, suspension or emulsion polymerization routes.

There are various ways to selectively achieve desirable particle sizes and desirable particle size distribution in the agglomerated latices. Along this line, the agglomeration of the elastomeric latex being treated is ordinarily terminable at a desired point of particle size build-up by a number of methods. Lowering the pH of the mass undergoing treatment to a pH that is at or preferably more acidic than neutral is one method that could be used.

Other ways to achieve desired particle sizes and distributions include (a) adjusting hydrophilicity of the AgAg used by significantly increasing or decreasing the quantity of copolymerized acid monomer present in the shell material and/or (b) chemically modifying the elastomeric constituent in the latex being treated, as by grafting thereon or interpolymerizing therewith a monomeric reactant capable of producing polymers having high glass transition temperature (Tg) features.

The quantity of the AgAg material to employ for agglomeration treatment of most completed elastomer latex products is usually on the order of from about 0.25 to about 5% by weight based on the total amount of elastomer (or rubber) to be agglomerated (this percentage being hereinafter referred to as "wt. % based on wt. rubber"). Advantageously, an amount of shell and core AgAg material of from about 0.4 to about 3 wt % based on wt. rubber is employed. In general, when there is a smaller percentage of shell material in the AgAg or lower amounts of acid in the shell, somewhat larger amounts of AgAg should be added to obtain the same amount of agglomeration.

It has been found very advantageous, when using a core and shell AgAg comprising about 20–35 wt. % shell material to use from about 1 to about 2 wt. % AgAg based on wt. rubber to be agglomerated, in order to achieve the incorporation of from about 0.3 to about 0.5 wt. % of shell material into the elastomer to be agglomerated. Usually, higher treating levels of AgAg material used for the agglomeration procedure result in greater agglomerating effectiveness (the coalescence of a higher percentage of starting particles in the elastomer-containing latex undergoing treatment). It should be noted that utilization of the AgAg material in proportions exceeding those necessary for entire or 100% agglomeration tends to decrease the average particle size of the agglomerated elastomer constituent in the completed latex product being treated. As used herein, the term "% agglomeration" refers to the percentage by volume of the agglomerated latex mass having particle sizes at least twice as large as the average particle size in the latex before agglomeration.

Besides those above indicated, other parameters of the agglomeration process influence and tend to provide control of the polydisperse particle size distribution characteristics of any given elastomer in the treated latex. Some of these variables include:

(1) Particle size of the AgAg material utilized vis-a-vis initial particle size of the elastomer in the completed latex product being treated, with smaller particle size AgAg's almost invariably promoting higher degrees of coalescence in elastomeric latices having a larger average particle size;

(2) Composition of the AgAg material as to content of interpolymerized acid monomer therein, with greater agglomeration effect being ordinarily experienced when the AgAg composition has more acid monomer therein interpolymerized and, correspondingly, more of the relatively larger size elastomer particles being obtained in the polydisperse particle size distribution arrangement when the AgAg shell material has higher acid monomer content interpolymerized therein.

As has been pointed out in the foregoing, any desired practical disposition and/or utilization of the polydisperse-particle-sized elastomer latex products agglomerated in accordance with the practice of the present invention can be followed. Thus, the agglomerated elastomer product can be recovered by coagulation or otherwise to produce "crumb" or its equivalent for direct use as rubber goods for whatever application may be intended; this including direct fabrication or other conversions thereof as into coatings and so forth (which may also include usage for polyblend manufacture or interpolymerization reactions in so-called mass, bulk or solution systems to prepare, by way of illustration, various types of rubber-modified, impact-resistant plastic products).

Very advantageously the treated, agglomerated elastomer latex can be directly employed to provide the rubber backbone or substrate ingredient for modification of rigid polymers such as polystyrene or poly(styrene acrylonitrile) by grafting of such rigid matrix polymers with and to the rubber. This can be done by emulsion or suspension polymerization techniques to provide HIPS, ABS and/or similar rubber-reinforced, impact-resistant products. In such employments, there is no need to recover the agglomerated elastomer from the treated latex. The treated latex in this connection embodies a minimum of matter which may be regarded as "foreign" to the system in comparison with agglomerated elastomer materials obtained by other heretofore known techniques. This enhances the compatibility of the agglomerated elastomer product and serves to well maintain its Tg. One of the reasons for this, as herein appears and is evident, is that practice of the present invention allows minimization of the amount of "active" agglomerating agent (that is, the interpolymerized, copolymerized and/or grafted acid and ester monomers in the shell), needed for satisfactory agglomeration results, in contrast to what has been required in the prior art means to such end.

In many cases, an agglomerated elastomer latex made in accordance with the present invention can be very nicely employed by the emulsion polymerization of a relatively small amount of graftable, polymerizable monomers thereto to obtain a so-called grafted rubber concentrate (GRC) supply which can then be interblended with other polymeric matrix components to produce very good impact-resistant products of the rubber-modified variety. In general, GRC's comprise at least about 30 wt. % rubber based on total GRC weight and usually at least about 40 wt. %.

In general, the monomers used as the graftable, polymerizable monomer(s) to form the graft portion of the GRC's and the monomer(s) used to form the polymeric matrix components for blending with such GRC's to form rubber-modified polymer compositions are known in the art and can be practically any polymerizable vinylidene monomer(s). They are preferably the same or similar monomer(s), but need not be as long as the graft polymer and matrix polymer are compatible polymers, as the term "compatible" is defined hereinafter. Examples of such vinylidene monomers are given in U.S. Pat. No. 3,825,621, which patent has been incorporated herein by reference. Very desirable monomers for formation of the graft portions of GRC's include one or more of the monomers selected from the group consisting of styrene, acrylonitrile and methyl methacrylate, the amounts and combinations of these monomers depending on the matrix polymer with which the GRC will be blended and on the properties desired in the resultant rubber-modified polymeric composition.

In a more particular application of this general type of usage, an ABS-type GRC can conveniently be prepared by emulsion polymerization of styrene and acrylonitrile in suitable proportion on an agglomerated elastomer latex which has been treated according to the practice of the present invention with a "core/shell" graft copolymer AgAg having a shell comprised of ethyl acrylate (EA) and methacrylic acid (MAA). This GRC is then polyblended in liquid vehicle with emulsion-made styrene/acrylonitrile (SAN) copolymer. The solid polymer recovered from the intermixed GRC and copolymer latices, is a very attractive rubber-reinforced, impact-grade ABS-type product very well suited for injection and other molding productions as well as expanded plastics manufacture.

Elastomer latices agglomerated in accordance with the present invention, especially when grafted with various interpolymerizable monomers, can be very satisfactorily employed, sometimes in addition to other elastomeric materials, to improve the properties of a wide variety of rigid, matrix polymers compatible with the interpolymer which is grafted onto the agglomerated elastomeric material. For the purposes of the present invention a first rigid, matrix polymer is considered compatible with a second interpolymer which is grafted onto an elastomeric material, if such first polymer, when different from the second, grafted interpolymer and when blended with an amount of the second interpolymer, displaces the glass transition temperature (Tg) of the second interpolymer. Preferably, a blend of an interpolymer and a compatible polymer exhibits a single Tg. The Tg of a composition is advantageously measured using a differential scanning calorimeter. The grafted interpolymerizable monomers can be advantageously selected so that such grafted rubber concentrates have graft sections which are at least slightly soluble in the rigid, matrix polymer. For example, GRC's comprising SAN grafted to an agglomerated butadiene/styrene/acrylonitrile rubber can be added to various polar, rigid polymers other than poly(styrene-acrylonitrile) such as copolymers of styrene with methyl methacrylate or maleic anhydride, polyvinyl chloride, polyvinylidene chloride or polycarbonates.

In another general type of application of the present invention, a GRC grafted with polystyrene, poly(styrene-acrylonitrile) or a similar type of polymer, the GRC being prepared from an elastomer latex which has been agglomerated according to the practice of the present invention, can be advantageously combined by blending or otherwise with polymers of phenylene ether to produce very desirable rubber-modified, impact-resistant polymrr compositions.

When an agglomerated elastomer latex is desired for GRC or analogous product preparation, it is oftentimes of utmost convenience and advantage to do the agglomerating treatment of the completed elastomer latex concurrently with the grafting or interpolymerizing of the additional polymeric materials therein to produce the GRC in one step. This can be very expeditiously accomplished by simultaneous or at least partially overlapping additions of the AgAg materials and the interpolymerizable monomer(s) constituent intended for grafting onto the involved elastomer for the manufacture of a given GRC or the like. This aspect provides obvious advantages over most agglomerating techniques in that total production time is reduced and intermediate pH-adjusting steps are not required between agglomeration and grafting steps.

For ultimate provision of either HIPS- or ABS-type products by an often desired mode of manufacture, one component which is desirable to have grafted to and/or otherwise admixed or combined with the agglomerated elastomer latex is a polymer or an interpolymer containing polymerized therein an effective amount, usually at least about 40% by wt., of at least one alkenyl aromatic monomer of the formula:

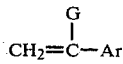

wherein G is selected from the group consisting of hydrogen and methyl and Ar is an aromatic radical including various alkyl- and halo-ring-substituted aromatic units containing from 6 to about 10 carbon atoms, with any balance of said polymerizate being a different (non-alkenyl aromatic) hydrocarbonaceous or halohydrocarbonaceous monomer which other monomer is polymerizable with styrene (St) and/or is polymerizable with an elastomer that is interpolymerizable with styrene. Suitable alkenyl aromatic monomers include: styrene, alpha-methylstyrene; ortho, meta- and/or paravinyl toluene; vinyl napthalene; the dimethyl styrenes; t-butyl styrene; the several chlorostyrenes (such as the mono- and dichloro-varients); the several bromostyrenes (such as the mono- and dibromo-varients); and so forth; various mixtures of the monomers being possible.

When ABS or ABS-type products are to be ultimately made from the agglomerated elastomer latex preparations, acrylonitrile (AN) or an equivalent cyanoalkylene must be converted to polymer present in the product along with the polymer of the alkenyl aromatic monomer, such as styrene, and the interblended polydisperse particle size elastomer that is employed, such as polybutadiene.

Additionally, for an ABS-type resin product, other cyanoalkylenes may be utilized along with or in place of AN. These, such as alpha-methacrylonitrile, are of the formula (which includes AN):

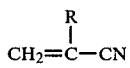

wherein R is selected from the group consisting of hydrogen and lower alkyl units containing not more than about 4 carbon atoms.

Relevant to the immediate foregoing, the compositions of various ABS and ABS-type resin products typically contain interpolymerized (or as interpolymerizates) therein: from about 10 to 60, preferably 20 to 35, parts by weight of AN or equivalent cyanoalkylene monomer including various mixtures thereof which may be comprised of AN; and from about 90 to 40, preferably 80 to 65 parts by weight of styrene or an equivalent alkenyl aromatic monomer including various mixtures thereof which may be comprised of styrene; with the desired elastomer, such as polybutadiene, being between about 1 and about 35, preferably from 5 to 30, % by wt. of the total composition weight, devoid of inert filler and/or plasticizing ingredients.

As is readily observable herein, practice of the present invention advantageously utilizes new and improved AgAg materials and takes advantage of the possibility of using agglomerating agents having much reduced acid contents or inherent acidity in comparison with the amounts of acid required in most adaptations of previously known systems while, at the same time, decreasing production time involvements in order to obtain satisfactory polydisperse particle size rubber and other elastomeric products. Minimization of acidic constituents in agglomerated elastomer tends to beneficially reduce or eliminate adverse coloration problems in plastic products made from or with the agglomerated elastomeric ingredients. In addition, the present invention advantageously agglomerates completed latex products.

EXAMPLES

The following illustrative examples show the great benefit of the present invention. In them, all parts and percentages are given on a weight basis and all temperature readings (unless otherwise specified) are in degrees Centigrade (°C.). Where particle sizes and particle size distributions are specified, they have been determined by hydrodynamic chromatography (HDC). This technique is explained in more detail in U.S. Pat. No. 3,865,717, which is incorporated herein by reference and is also discussed in a journal article by M. A. Langhorst in a forthcoming issue of "Colloid Science".

FIRST ILLUSTRATION—THE AGGLOMERATING AGENTS

EXAMPLE I

Preparation of Agglomerating Agent A—Ethyl Acrylate/Methacrylic Acid (92/8) 20% Shell Into an agitated reactor outfitted for nitrogen blanketing of the contents there are charged: 1,009 parts of a 35% solids polybutadiene latex having an average particle size of 1,000 Å; 360 parts water; 1 part acetic acid to give the reaction mass a pH of 4; 0.085 part of the bisodium salt of ethylenediaminetetracetic acid (herein referred to as "EDTA.2Na+" or just "EDTA") and 1.05 parts of $K_2S_2O_8$. Heat is applied until the charged contents reach 65° C. At this point, two continuous addition streams are started and feed into the reactor. One is an aqueous stream which is charged over a 1¼ hour period and contains 68 parts of a water solution of 0.125% $K_2S_2O_8$ and 2.5% sodium dodecylbenzene sulfonate. The other is a monomer stream which is charged over a one-hour period and consists of 85 parts of a 92:8 weight ratio mixture of ethyl acrylate (EA) and methacrylic acid (MAA) calculated to give a 20% shell in the resulting graft copolymer (based on wt. polybutadiene plus wt. interpolymerized EA and MAA contents). After the addition is completed, the reaction mass is maintained at 65° C. with continued stirring for 3 additional hours. Analysis of the resulting AgAg graft copolymer latex material shows that approximately 100% interpolymerization of the acid and acrylate monomers has been achieved to yield particles consisting of 20% shell, the shell consisting of about 92% EA and 8% MAA. Extraction with methyl ethyl ketone (MEK) of the resultant AgAg material demonstrates that 79% of the EA/MAA monomeric mixture has actually been grafted to the 1,000 Å polybutadiene (PBD) particles and 21% exists in the shell as non-grafted EA/MAA copolymer.

EXAMPLE II

Utilization of AgAg A to Agglomerate a Latex

12 Parts of a 10% latex dispersion of AgAg A are added with applied agitation to 172 parts of a 1,000 Å, 35% solids polybutadiene latex; this constituting an addition of 2 wt. % of the AgAg based on the weight of the rubber to be agglomerated. The pH of the latex mass is adjusted to 9.0 with dilute $NH_4OH$. Analysis of the agglomerated latex shows that 42% of the total volume of particles contained therein have diameters greater than 2,000 Å (i.e., 42% agglomeration has been achieved).

EXAMPLE III

Agglomerating Agent B—Ethyl Acrylate/Methacrylic Acid (95.6/4.4) 20% Shell

Into an agitated reactor are placed 981 g of a 1900 Å butadiene/styrene/acrylonitrile (93/5/2) rubber latex (37.2% solids), 388 g of water, 0.255 g of $K_2S_2O_8$, and 0.085 g of EDTA.2Na+. The pH of the mixture is adjusted to 3.5 using acetic acid. The mixture is then heated to 65° C. At this point two continuous addition (conadd) feed streams are started and added over a one hour period. One is 72 g of an aqueous stream consisting of 2.12% sodium dodecylbenzene sulfonate. The other stream is 87 g of a monomer mixture of 95.6% ethyl acrylate and 4.4% methacrylic acid. The mixture is heated at 65° C. for 4 hours after the conadd streams are finished. The AgAg particles produced consist of 20% shell, the shell consisting of about 95.6% EA and 4.4% MAA.

EXAMPLE IV

Agglomerating Agent C—Ethyl Acrylate/Methacrylic Acid (98/2) 40% Shell

Into an agitated reactor are placed 752 g of 1000 Å rubber latex (34.7% solids), 360 g of water, 0.51 g of $K_2S_2O_8$, and 0.174 g of EDTA.2Na+. The pH is adjusted to 3.5 using acetic acid. The mixture is heated to 65° C. At this point, two feed streams are started and fed into the reactor. One is 140 grams of an aqueous stream of 2.12% sodium dodecylbenzene sulfonate and the other is 174 g of a monomer stream, the stream consisting of 98% ethyl acrylate and 2% methacrylic acid. These two streams are added over a two hour period. The latex is heated an additional two hours at 65° C. and then 0.175 g of $K_2S_2O_8$ in 5 ml of water is added. The latex is heated an additional two hours after that. Conversion is found to be 94.4%. The AgAg particles produced consist of about 40% shell, the shell consisting of about 98% EA and 2% MAA.

EXAMPLE V

Agglomerating Agent D—Ethyl Acrylate/Methacrylic Acid (95/5) 20% Shell

This agglomerating agent is made the same as AgAg B except a 1000 Å rubber latex core is used and the monomer feed stream contains 95% ethyl acrylate and 5% methacrylic acid. The AgAg particles consist of about 20% shell, the shell consisting of about 95% EA and 5% MAA.

EXAMPLE VI

Agglomerating Agent E—Ethyl Acrylate/Methacrylic Acid (92/8) 5% Shell

The procedure use for preparation of agglomerating agent A is followed except 17 parts of the aqueous feed stream are added and 21 parts of the monomer feed stream are added. The AgAg particles consist of about 5% shell, the shell consisting of about 92% EA and 8% MAA.

SECOND ILLUSTRATION—AGGLOMERATION OF ELASTOMER LATICES

Examples VII through XIII

The following Table shows the results of using AgAg's A, B, C, D, and E following the general procedure of Example II above. This demonstrates the effect of the agglomerating agent(s) on particle size (P.S.) increases for various types of elastomer latices that were completed as to their polymerization and devoid of residual monomer prior to treatment for agglomeration in accordance with the present invention.

The agglomerating agents are added to the elastomer latices at room temperature. The pH of the resultant mass is adjusted to about 9.0 to 9.2.

TABLE 1

Agglomeration of Rubber[1]

| Example Number | AgAg | % AgAg[2] | % Acid in AgAg | Average Particle Diameter Of Rubber Before Agglomeration[3] | Total % Acid Added[4] | Total % EA/MAA Added[5] | % Agglomeration[6] |
|---|---|---|---|---|---|---|---|
| VII | A | 2.0 | 1.6 | 1000Å° | .0032 | 0.40 | 42 |
| VIII | D | 1.0 | 1.0 | 1000Å° | .0010 | 0.20 | 32 |
| IX | D | 2.0 | 1.0 | 1000Å° | .0020 | 0.40 | 40 |
| X | C | 2.0 | 0.80 | 1000Å° | .0016 | 0.80 | 14 |
| XI | B | 2.0 | 0.88 | 1000Å° | .0018 | 0.40 | 21 |
| XII | B | 2.0 | 0.88 | 1900Å° | .0018 0.40 | 32 | |
| XIII | E | 2.0 | 0.40 | 1000A | .0008 | 0.10 | 5 |

[1]Polybutadiene rubber containing BD/S/AN (93/5/2)
[2]Wt. % AgAg based on the total weight of the rubber in the latex to be agglomerated.
[3]Less than 1% of the starting particles have diameters greater than twice the average particle size before agglomeration.
[4]Wt. % of acid based on wt. rubber in the latex to be agglomerated.
[5]Wt. % EA/MAA based on the weight rubber in the latex to be agglomerated.
[6]As measured by the volume % of particles converted to at least twice the average particle size (diameter) before agglomeration.

THIRD ILLUSTRATION—THE EFFECT OF PH ON AGGLOMERATION

The following experiments show the useful pH range for agglomeration of a completed rubber using a shell and core agglomerating agent.

To an agitated mixture of 1204 g of a butadiene/styrene/acrylonitrile (93/5/2) rubber latex (38.2% solids) having an average particle size of 1000 Å, the mixture being at 70° C., is added a mixture of 12.06 g of agglomerating agent A (28.6% solids), 1.0 g of sodium dodecylbenzene sulfonate, and 172 g of water over a 40 minute period. The pH of the latex in the reactor is adjusted to about 6.0 using acetic acid before addition of the agglomerating agent. After the addition of the AgAg the pH is 5.6 and no agglomeration occurs. When a similar experiment is run at a pH of 7.6, 62% by volume of the particles agglomerate to particles having diameters at least twice as large as the average particle size of the unagglomerated particles. When the pH of the initial latex is 10.5, 28% of the particles are agglomerated.

FOURTH ILLUSTRATION—COMPARING CORE AND SHELL GRAFT-COPOLYMER AGGLOMERATING AGENT WITH SOLID INTERPOLYMER AGGLOMERATING AGENTS

The following experiments compare the effectiveness of a shell and core agglomerating agent according to the present invention with the effectiveness of an interpolymer agglomerating agent of the prior art.

To an agitated reactor containing 1227 g of 1000 Å butadiene/styrene/acrylonitrile (93/5/2) rubber (37.5% solids) at a pH of 9.3 maintained at 70° C. is added 185 g of a solution of 1.87% agglomerating agent A, consisting of 20% shell said shell consisting of 92% EA and 8% MAA, 0.54% sodium dodecylbenzene sulfonate, and the balance water, over a 40 minute period. This amounts to 0.75% of the shell and core AgAg being added, based on rubber in the reactor. This constitutes 0.15% ethyl acrylate/methacrylic acid copolymer in the latex based on the weight of rubber in the latex to which the copolymer is added. Approximately 49% of the rubber agglomerates to larger particles. The experiment is repeated using an interpolymer agglomerating agent of the prior art containing 95% ethyl acrylate and 5% acrylic acid. Two levels of agglomerating agent are added, 0.15% and 0.50%, both percentages being based on the weight of rubber to which the agents are added. The amounts of agglomeration observed are 15.8% and 48% respectively. These examples show the improved effectiveness of the shell and core agglomerating agent of the present invention, requiring the use of less of the acid/acrylate copolymer to achieve the same amount of agglomeration.

FIFTH ILLUSTRATION—PREPARATION AND GRAFTING OF AGGLOMERATED RUBBER LATICES TO PRODUCE RUBBER MODIFIED THERMOPLASTIC RESIN PRODUCTS

EXAMPLE XIV

Rubber Modified Polymethylmethacrylate

Into a 3-liter, 3-necked round bottom flask is placed 1227 g of a butadiene/styrene/acrylonitrile (93/5/2) rubber latex (460 g of rubber solids) having 1000 Å particles. The reactor is heated to 70° C., with stirring under $N_2$.

When the temperature reaches 70° C., 185 g of an agglomerating agent stream is added over a 40 minute period (278 g/hour for 40 minutes). This stream contains 1.87% shell and core grafted agglomeration agent A, 0.541% sodium dodecylbenzene sulfonate (SDBS), and the balance water. A total of 0.75% of the shell and core agglomerating agent is added (based on rubber). The rubber latex is found to be about 49% agglomerated.

This agglomerated rubber is then grafted by adding 565 g of methyl methacrylate containing 0.345% n-octyl mercaptan in one stream and 555 grams of a second aqueous feed stream containing 0.233% $Na_2S_2O_8$, 2.58% SDBS and the balance is water. The latex is heated one hour at 70° C., steam stripped, stabilized with antioxidants and freeze coagulated to form what is referred to as a grafted rubber concentrate (GRC). The air dried powdered GRC is compounded with general purpose polymethylacrylate to give a 20% rubber resin having the following injection molded properties: tensile strength at yield (Ty)—6185 psi; tensile strength at rupture (Tr)—5200 psi; percent elongation (% E)—34; notched Izod (Izod)—2.2 ft.lb./inch of notch; and Gardner Gloss taken at 60° (gloss)—85%. Ty, Tr and % E values are determined above and hereinafter according to ASTM (American Society for Testing Materials) test number D-638 at 0.2 in./min. The above and following Izod values are determined according to ASTM D-256 at 73° F. Gloss values in this and following examples are determined according to ASTM D-523.

EXAMPLE XV

Styrene/Methacrylic Acid Grafting of Agglomerated Rubber in the Preparation of Rubber Modified Poly(styrene acrylic acid)

Into a 3-liter, 3-necked round bottom flask, under $N_2$ is placed 1000 g of a 1000 Å monodisperse rubber latex containing 350 g of rubber solids. The reactor is heated to 70° C. and 145 g an agglomerating agent stream added over a one-half hour period. This stream contains 2.41% shell and core agglomerating agent A (1.0% based on rubber to be agglomerated), 0.138% SDBS, the balance water. A sample drawn for particle size analysis exhibits 33.3% agglomeration. The pH is adjusted by adding a dilute acid solution to give a pH of 3.5. An additional 1.0 part of SDBS is also added at this time.

This polydisperse rubber is grafted with 525 g of a mixture of styrene/methacrylic acid (91/9) containing 1.53% n-octyl mercaptan. An aqueous stream having a mass of 685 g and containing 0.153% SDBS, 0.153% $K_2S_2O_8$ and the balance water is also added over five hours.

The latex is steam stripped, stabilized with antioxidants, and freeze coagulated. The dry powder GRC is compounded with general purpose poly(styrene acrylic acid) (92/8) to give a 20% rubber resin having the following injection molded properties: Ty—5215 psi; Tr—4300; % E—13; Izod—3.7; Vicat heat distortion temperature (Vicat)—246° F. In this example and following examples, Vicat values are determined according to ASTM D-1525.

EXAMPLE XVI

Agglomeration of Rubber and Grafting with Polystyrene to Prepare HIPS

Into an agitated 5-liter reactor is placed 1950 g of a finished 1000 Å rubber latex (36.0% solids) and 35.6 g of a 10% sodium dodecylbenzene sulfonate solution. The mixture is heated to 70° C. and 398 g of an aqueous stream containing 3.75% agglomerating agent A, 0.61% sodium dodecylbenzene sulfonate, and the balance water, is added over a one hour period. Examination of a sample shows the rubber to be 66% converted to larger particles. To this agglomerated latex, while still at 70° C., is added over a four hour period, 600 g of an aqueous stream and 702 g of a monomer stream. The aqueous stream contains 2.58% sodium dodecylbenzene sulfonate, 0.23% sodium persulfate and the balance water. The monomer stream contains 0.20% n-octyl mercaptan in styrene. The latex is heated for one hour, steam stripped to remove residual monomers, stabilized with antioxidants, and the polymer isolated by freeze coagulation. The final resin contains 54.1% rubber.

The resin was compounded with polystrene to give a resin with 20% rubber. The compounded product is injection molded into test specimens which possess the following good gloss, flow, and toughness properties: Ty—3400 psi; Tr—2850 psi; % E—18; Izod—1.3 ft. lbs/inch of notch; melt flow rate (MFR)—0.8 g/10 minutes (Cond. G); gloss—78%. Melt flow rates in this and other examples herein being determined according to ASTM D-1238.

EXAMPLES XVII, XVIII AND XIX

Agglomeration of a Finished Butadiene Rubber and Grafting with Styrene/Acrylonitrile for Preparation of ABS

EXAMPLE XVII

To an agitated reactor at 90° C. containing 1638 g of a 35% solids, finished rubber latex having 1060 Å particles and a pH of 9.0 is added over a 20 minutes period, 116 g of an aqueous agglomerating agent stream. This stream contains 0.52% sodium dodecylbenzene sulfonate, 2.0% shell and core agglomerating agent A, and the balance water. The amount of shell and core agglomerating agent added is 0.41% (based on rubber to agglomerated) which corresponds to 0.08% ethylacrylate/methacrylic acid copolymer. The latex is 48% converted to larger particles.

To the 90° C. agglomerated rubber latex is added 676 g of an aqueous stream and 702 g of a monomer stream over a five hour period of time. The aqueous stream contains 0.03% sodium persulfate and 2.8% sodium dodecylbenzene sulfonate soap. The monomer stream contains 71.7% styrene, 27.9% acrylonitrile, and 0.35% n-octyl mercaptan. The latex is heated one hour, steam stripped, stabilized, and the polymer isolated by freeze coagulation. The grafted rubber concentrate is blended to 20% rubber with SAN copolymer on a 0.8 inch W.E. Extruder. The injection molded specimens have an excellent balance of toughness and gloss: Ty—6200 psi; Tr—4560 psi; Izod—3.7 ft.lbs/inch of notch; % E—53; MFR—2.9 g/10 minutes (Cond. I); gloss 91%.

EXAMPLE XVIII

Into an agitated reactor is charged 1303 g of a 1000 Å butadiene rubber latex (35.3% solids) with a pH of 8.1. The mixture is heated to 70° C. and 184 g of an aqueous AgAg stream is added over a 40 minute period. The AgAg stream contains 1.85% agglomerating agent A, 0.54% sodium dodecylbenzene sulfonate, and the balance water. Then 0.75% shell and core agglomerating agent is added resulting in (0.15% ethyl acrylate/methacrylic acid copolymer) in the agglomerated latex. 55% Of the small 1000 Å particles are converted to larger size. To this 70° C. agglomerated latex is added over a five hour period, 565 g of a monomer stream, and 550 g of an aqueous stream. The monomer stream contains 71.7% styrene, 27.9% acrylonitrile, and 0.34% n-octyl mercaptan. The aqueous stream contains 2.58% sodium dodecylbenzene sulfonate, 0.23% sodium persulfate, and the balance water. The latex is heated for 0.5 hours after the additions are finished, steam stripped, stabilized with antioxidants, and the polymer isolated by freeze coagulation. The grafted rubber concentrate is blended with SAN on a 0.8 inch Welding Engineers twin screw extruder to give an ABS resin having 22% rubber and an excellent balance of physical properties of gloss, flow and toughness. Injection molded properties of the ABS are: Ty—5770 psi; Tr—4530 psi; % E—11; Izod—5.8 ft.lbs/inch of notch; gloss—94%; MFR—3.0 g/10 minutes (Cond. I).

EXAMPLE XIX

In a similar experiment, a 1220 Å finished polybutadiene rubber latex having a pH of 9.1 is agglomerated with 0.66% of agglomerating agent A to give 55% of the particles converted to larger size. This agglomerated latex is grafted with SAN, isolated, compounded with SAN and molded, all as in the previous example to achieve samples having various rubber levels both with and without added waxes and flow aids. The blends have very desirable balances of melt flow, gloss and toughness as shown in Table II below.

TABLE II

| | ABS Compositions | | | | | |
|---|---|---|---|---|---|---|
| % Rubber | Ty (psi) | Tr (psi) | % E | Izod[1] | MFR[2] | Gloss |
| 17 | 6860 | 4900 | 32 | 2.0 | 5.1 | 95% |
| 17[3] | 6200 | 4650 | 34 | 4.0 | 5.8 | 96% |
| 21 | 6350 | 4650 | 42 | 5.2 | 4.0 | 89% |
| 22[3] | 5750 | 4400 | 37 | 6.4 | 3.7 | 90% |
| 24 | 6200 | 4600 | 32 | 6.4 | 2.2 | 93% |
| 23[3] | 5750 | 4550 | 25 | 7.4 | 2.2 | 94% |

[1] ft. lbs/inch of notch
[2] g/10 minutes, Cond. I
[3] Contains 1.0% bisstearamide wax and 0.5% hydrogenated tallow

SIXTH ILLUSTRATION—A COMPARATIVE EXAMPLE SHOWING THE GRAFTING OF AN UNAGGLOMERATED RUBBER LATEX AND ITS USE TO PREPARE ABS

In another experiment, not an example of the present invention, no agglomerating agent is added to a rubber latex before grafting. The GRC containing 50% rubber is blended with SAN to give a resin having 17% rubber that is very brittle as shown by the following properties: Ty—6380 psi; Tr—5075 psi; % E—3; Izod—0.7 ft.lbs./inch of notch.

SEVENTH ILLUSTRATION—THE AGGLOMERATION OF ACRYLATE RUBBERS

EXAMPLE XIX

The Agglomeration of 1,000 Å Particles of Polybutylacrylate Rubber

A mixture of 1,000 parts of a polybutylacrylate latex comprising 372 parts polybutylacrylate rubber having an average particle size of 1,200 Å and containing 1.0% trimethylolpropanetriacrylate crosslinker, the mixture being at a pH of 4.2, is heated to 70° C. and agitated. To the agitated mixture is added, over a 40 minute period, 78.9 parts of an agglomerating agent stream consisting of 3.54% AgAg A, 1.14% SDBS and the balance water. This amounts to an addition of 0.75% core/shell AgAg based on the weight of the rubber to be agglomerated. At this point the pH remains at 4.2 and no agglomeration has occurred. Minutes after the pH is adjusted to 9.2 with dilute sodium hydroxide, 70% agglomeration is found to occur.

EXAMPLE XX

The Agglomeration of 4,500 Å Particles of Polybutylacrylate Rubber

The rubber used was in the form of 1,127 parts of a polybutylacrylate rubber latex, said latex comprising 372 parts polybutylacrylate having an average particle diameter of 4,500 Å with essentially none of the particles having diameters greater than about 6,000 Å, the polybutylacrylate containing 0.5% trimethylolpropane-triacrylate crosslinker. This latex is agglomerated following the procedure of Example XIX except that the pH of the mixture is adjusted to 8.9 with dilute sodium hydroxide prior to the addition of any part of the AgAg stream. As in Example XIX, the added AgAg stream amounts to an addition of 0.75% core/shell AgAg based on the weight of the rubber to be agglomerated. It is found that about 30% by volume of the particles now have diameters over about 9,000 A° (i.e., 30% agglomeration) while over 50% now have diameters greater than 6,000 A°.

Good results, analogous to those shown in the above examples of the present invention are obtained in pursuit of the invention by using other AgAg materials for agglomerating other elastomer latices and, if desired, making other rubber-modified thermoplastic resin products (for conversion to excellent moldings, coatings, foams and so forth) from such polydisperse particle size elastomer agglomerations.

Many changes and modifications can readily be made and adapted in specifically altered embodiments in accordance with the present invention without substantially or materially departing from its apparent and intended spirit and scope, all in pursuance and accordance with same as it is set forth and defined in the following Claims.

What is claimed is:

1. An agglomerating agent (AgAg) suitable for agglomerating the particles of a latex of an elastomeric material which AgAg is a dispersion of particles having core material and shell material, said AgAg comprising:
   (a) as shell material substantially grafted to the core material, from about 5 to about 50 weight percent, based on the total weight of the AgAg of a polymerized mixture of:
   (i) from about 80 to about 99.5 weight percent based on the total weight of component (a) of ester monomer of the formula:

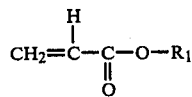

wherein $R_1$ is a lower alkyl radical containing up to about 4 carbon atoms; and
   (ii) from about 0.5 to about 20 weight percent based on weight component (a) of an ethylenically unsaturated mono- or difunctional carboxylic acid having from about 3 to about 8 carbons;
   (b) as core material, from about 50 to about 95 weight percent, based on the total weight of the AgAg, of an elastomeric material, such core material having polymerized therein essentially no ester monomer which is polymerized in the shell material.

2. The AgAg according to claim 1 wherein subcomponent (ii), the acid monomer has formula:

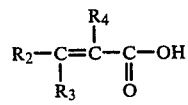

wherein $R_2$ and $R_3$ are independently selected from the group consisting of —H and —COOH and $R_4$ is selected from the group consisting of —H, —COOH and lower alkyl radicals containing up to about 4 carbon atoms.

3. The AgAg according to claim 2 which is suitable for agglomerating the particles of a latex of an elastomeric material which is at least 95% polymerized.

4. The AgAg according to claim 3 wherein component (b), the core material, is at least about 65 weight percent of the AgAg, and component (a), the shell material, is less than about 35 weight percent of the AgAg.

5. The AgAg according to claim 3 wherein component (b), the core material, is at least about 80 weight percent of the AgAg, and component (a), the shell material, is less than about 20 weight percent of the AgAg.

6. The AgAg according to claim 3, wherein component (a), the shell material, is a polymerized mixture of from about 90 to about 95 weight percent of subcomponent (i), the ester monomer, and from about 5 to about 10 weight percent of subcomponent (ii), the acid monomer.

7. The AgAg according to claim 6 wherein subcomponent (i), the ester monomer, consists essentially of ethyl acrylate (EA) and subcomponent (ii), the acid monomer, consists essentially of methacrylic acid (MAA).

8. The AgAg according to claim 7 wherein component (b), the core material, consists essentially of the polymerization product of butadiene and one or more of the monomers selected from the group consisting of styrene and acrylonitrile.

9. A method of agglomerating the particles of a latex of an elastomeric material, said process comprising:
   (a) maintaining the pH of the latex from about 7 to about 11;
   (b) treating the latex with an effective amount of an AgAg, which AgAg is defined in claim 2; and
   (c) allowing the particles of the latex to agglomerate.

10. The method according to claim 9 wherein the latex of elastomeric material, the particles of which are desired to be agglomerated, is at least 95% polymerized.

11. The method according to claim 10 wherein from about 0.4 to about 3 weight percent AgAg based on the weight of the elastomeric material to be agglomerated (wt. % based on wt. rubber) is used.

12. The method according to claim 10 wherein from about 0.5 to about 1.5 weight percent AgAg based on the weight of the elastomeric material to be agglomerated (wt. % based on wt. rubber) is used.

13. The method according to claim 12 wherein the elastomeric material, the particles of which are desired to be agglomerated consists essentially of the polymerization product of butadiene and one or more of the monomers selected from the group consisting of styrene and acrylonitrile.

14. The method according to claim 13 wherein component (b) the core material has the same composition as the elastomeric material, the particles of which are desired to be agglomerated.

15. A method of producing a grafted rubber concentrate (GRC) having included therein at least about 30% by weight elastomeric material which method consists of:
   (a) agglomerating the particles of a latex of an elastomeric material according to claim 9;
   (b) adding an effective amount of graftable, polymerizable monomer component; and
   (c) causing such added monomer to interpolymerize and also causing the grafting of an effective amount of interpolymer onto the particles of elastomeric material.

16. The method according to claim 15 wherein the latex of elastomeric material, the particles of which are desired to be agglomerated, is at least 95% polymerized.

17. The method according to claim 16 wherein at least a portion of the graftable, polymerizable monomer component is added while the AgAg is being added.

18. The method according to claim 16 wherein the elastomeric material is in the form of particles having a polydispersed particle size distribution.

19. The method according to claim 16 wherein the graftable, polymerizable monomer component is a combination of styrene and acrylonitrile.

20. A method of producing a rubber-modified polymer composition which method comprises
   (a) agglomerating the particles of a latex of an elastomeric material according to claim 9; and
   (b) polymerizing in the presence thereof a monomer mixture.

21. A method of producing a rubber-modified polymer composition which method comprises combining with a GRC obtained in accordance with claim 18, an additional amount of a rigid polymer compatible therewith.

22. An elastomeric material agglomerated according to the process of claim 9.

23. An elastomeric material agglomerated according to the process of claim 11.

24. A rubber-modified polymer composition comprising a polydispersed particle size elastomer, said composition achieved according to the process of claim 20 or 21.

25. A GRC produced according to the process of claim 15.

* * * * *

UNITED STATES PATENT AND TRADEMARK OFFICE
CERTIFICATE OF CORRECTION

PATENT NO. : 4,419,496

DATED : Dec. 6, 1983

INVENTOR(S) : David E. Henton; Teresa M. O'Brien

It is certified that error appears in the above—identified patent and that said Letters Patent is hereby corrected as shown below:

Col. 1, line 39, "time, the" should read --time however, the--.

Col. 5, line 41, "monomer" should read --monomers--.

Col. 7, line 7, "wt. % Such" should read --wt.%. Such--; line 63, "particles" should read --particle--.

Col. 8, line 30, "material" should read --materials--.

Col. 11, line 42, "polymer" should read --polymeric--.

Col. 12, line 43, "polymrr" should read --polymer--.

Col. 12, line 49, "therein" should read --thereto--.

Col. 13, line 16, "napthalene" should read --naphthalene--.

Col. 15, TABLE I, the third column heading "%AgAg" should read --%AgAg$^2$--; in line Example Number XII under 6th and 7th headings, "32    " should read --0.40    32-- respectively; under fifth column heading delete "0.40". On line Example No. XIII, line "1000A" should read --1000A--.

UNITED STATES PATENT AND TRADEMARK OFFICE
CERTIFICATE OF CORRECTION

PATENT NO. : 4,419,496
DATED : December 6, 1983
INVENTOR(S) : David E. Henton et al.

It is certified that error appears in the above-identified patent and that said Letters Patent is hereby corrected as shown below:

Col. 18, line 66, "polystrene" should read -- polystyrene --.

Signed and Sealed this

Ninth Day of October 1984

[SEAL]

Attest:

GERALD J. MOSSINGHOFF

Attesting Officer

Commissioner of Patents and Trademarks